(12) United States Patent
Hayashi

(10) Patent No.: US 10,971,097 B2
(45) Date of Patent: Apr. 6, 2021

(54) DISPLAY DEVICE

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/556,877

(22) Filed: Aug. 30, 2019

(65) Prior Publication Data

US 2019/0391429 A1  Dec. 26, 2019

Related U.S. Application Data

(63) Continuation of application No. 15/726,426, filed on Oct. 6, 2017, now Pat. No. 10,444,556.

(30) Foreign Application Priority Data

Oct. 14, 2016 (JP) .............................. JP2016-202704

(51) Int. Cl.
*G09G 3/36* (2006.01)
*G02F 1/1345* (2006.01)
(Continued)

(52) U.S. Cl.
CPC ....... *G09G 3/3648* (2013.01); *G02F 1/13454* (2013.01); *G02F 1/136286* (2013.01);
(Continued)

(58) Field of Classification Search
CPC ............. G02F 1/13336; G02F 1/13454; G02F 1/136286; G02F 1/136227; H01L 27/3293;
(Continued)

(56) References Cited

U.S. PATENT DOCUMENTS 8,830,436 B2  9/2014 Tamaki et al.
9,224,759 B2  12/2015 Nagasawa et al.
(Continued)

FOREIGN PATENT DOCUMENTS

JP  2015-184668 A  10/2015

OTHER PUBLICATIONS

Japanese Office Action dated Jun. 30, 2020 for the corresponding Japanese application No. 2016-202704, with partial English machine translation retrieved from EPO Global Dossier.

*Primary Examiner* — Angela K Davison
(74) *Attorney, Agent, or Firm* — Michael Best & Friedrich LLP

(57) ABSTRACT

A display device includes a first substrate; and a circuit layer arranged on the first substrate and comprising a first scanning signal line driving circuit arranged on the side of a first side of the first substrate, a second scanning signal line driving circuit arranged on the side of a second side, a third scanning signal line driving circuit arranged between the first scanning signal line driving circuit and the second scanning signal line driving circuit, and each of a plurality of pixel circuits including a first pixel circuit and a second pixel circuit, the first pixel circuit being arranged in a region between the first scanning signal line driving circuit and the third scanning signal line driving circuit, and the second pixel circuit being arranged in a region between the third scanning signal line driving circuit and the second scanning signal line driving circuit.

6 Claims, 16 Drawing Sheets

(51) Int. Cl.
  *G02F 1/1362* (2006.01)
  *G02F 1/1333* (2006.01)
  *G09G 3/3233* (2016.01)
  *G02F 1/1343* (2006.01)
  *G02F 1/1335* (2006.01)
  *G02F 1/1339* (2006.01)

(52) U.S. Cl.
  CPC ........ *G02F 1/1339* (2013.01); *G02F 1/13336* (2013.01); *G02F 1/133512* (2013.01); *G02F 1/134336* (2013.01); *G02F 2201/121* (2013.01); *G02F 2201/123* (2013.01); *G09G 3/3233* (2013.01); *G09G 2300/026* (2013.01); *G09G 2300/0408* (2013.01); *G09G 2300/0426* (2013.01); *G09G 2300/0842* (2013.01)

(58) Field of Classification Search
  CPC .. G09F 9/3026; G09G 3/3648; G09G 3/3233; G09G 2300/026; G09G 2300/0408
  See application file for complete search history.

(56) References Cited

U.S. PATENT DOCUMENTS

| | | |
|---|---|---|
| 2009/0009698 A1 | 1/2009 | Moon et al. |
| 2009/0058768 A1 | 3/2009 | Ishimoto et al. |
| 2012/0162594 A1 | 6/2012 | Tamaki et al. |
| 2015/0016928 A1 | 1/2015 | Lopez et al. |
| 2015/0310801 A1* | 10/2015 | Lin ...................... G09G 3/3225 345/205 |
| 2015/0364396 A1 | 12/2015 | Asai et al. |
| 2017/0288002 A1* | 10/2017 | Kim ................... H01L 51/0097 |
| 2017/0343868 A1* | 11/2017 | Kim ...................... G02F 1/1368 |

* cited by examiner

DISPLAY DEVICE

CROSS REFERENCE TO RELATED APPLICATIONS

This application is a continuation of U.S. patent application Ser. No. 15/726,426 filed on Oct. 6, 2017. Further, this application is based upon and claims the benefit of priority from the prior Japanese Patent Application No. 2016-202704 filed on Oct. 14, 2016, the entire contents of which are incorporated herein by reference.

FIELD

The present invention relates to a display device. Particularly, the present invention relates to a layout of circuits included in the display device.

BACKGROUND

A large screen has been required for a signage used for guide display, advertisement display, or the like in outdoors and stores and facilities. As an attempt therefor, a technique for achieving a large screen by arranging a plurality of liquid crystal displays in a tile shape or a brick shape, for example, has been known (e.g., Japanese Laid-Open Patent Publication No. 2015-184668).

SUMMARY

According to an aspect of the present invention, there is provided a display device comprising: a first substrate; and a circuit layer arranged on the first substrate and comprising a first scanning signal line driving circuit arranged on the side of a first side of the first substrate, a second scanning signal line driving circuit arranged on the side of a second side opposing the first side of the first substrate, a third scanning signal line driving circuit arranged between the first scanning signal line driving circuit and the second scanning signal line driving circuit, each of a plurality of pixel circuits respectively corresponding to any one of a plurality of pixels and including a first pixel circuit and a second pixel circuit, the first pixel circuit being arranged in a region between the first scanning signal line driving circuit and the third scanning signal line driving circuit, and the second pixel circuit being arranged in a region between the third scanning signal line driving circuit and the second scanning signal line driving circuit, a video signal line driving circuit arranged on the side of a third side between the first side and the second side of the first substrate, a plurality of scanning signal lines each connected to any one of the first to third scanning signal line driving circuits, and a plurality of video signal lines each connected to the video signal line driving circuit.

According to another aspect of the present invention, there is provided a display device comprising: a first substrate including a display region having a plurality of reflective pixel electrodes, and a peripheral region surrounding the display region; and a circuit layer arranged on the first substrate and including a plurality of switching elements respectively provided for the reflective pixel electrodes, and a scanning signal line driving circuit overlapping at least some of the plurality of reflective pixel electrodes in a planar view and inputting a driving signal to the plurality of switching elements.

DESCRIPTION OF EMBODIMENTS

Figure 1:
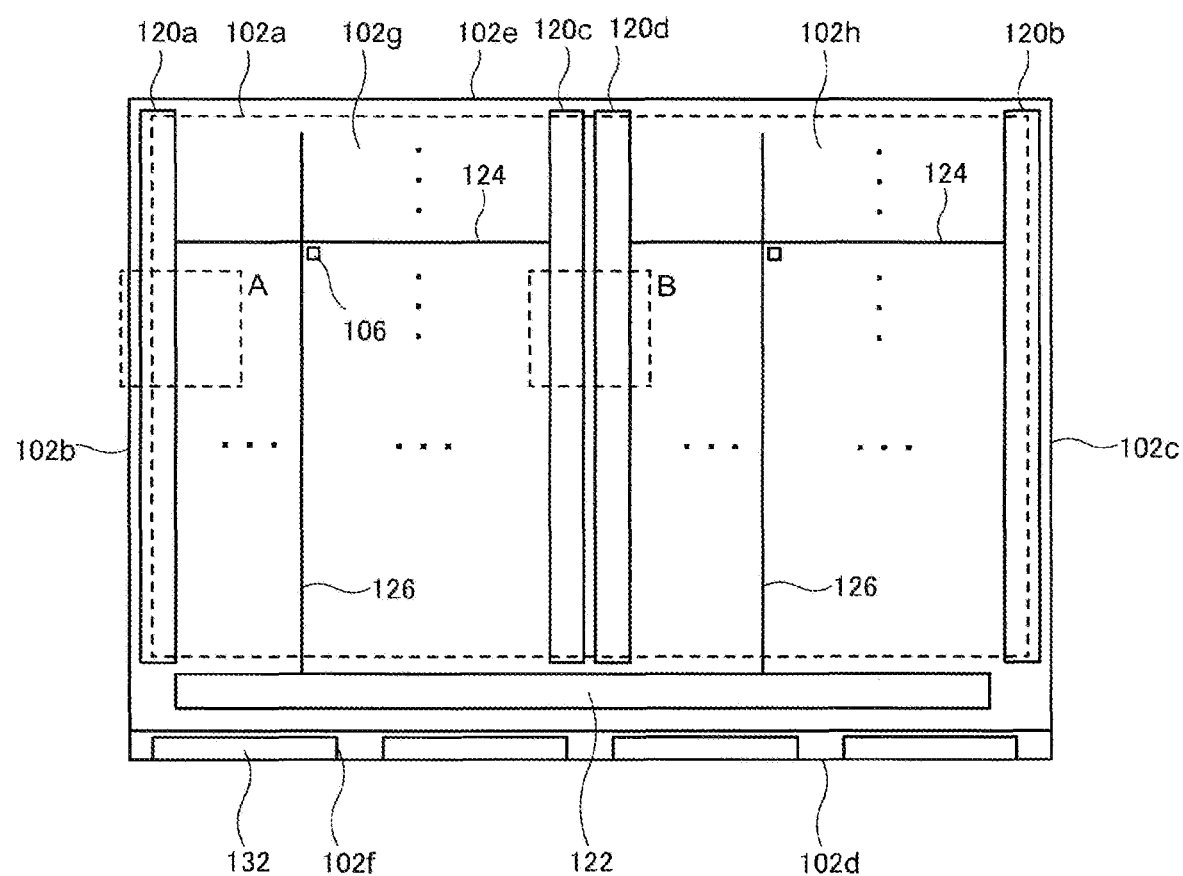
FIG. 1 is a plan view illustrating a schematic configuration of a display device according to a first embodiment of the present invention.

A configuration of a display device according to an embodiment of the present invention will be specifically described below with reference to the drawings. The display device according to the present invention is not limited to the following embodiments but can be implemented by making various modifications. For convenience of illustration, a dimensional ratio in the drawings may be different from an actual ratio, or some of components may be omitted from the drawings.

In a liquid crystal display, a so-called frame region exists at a peripheral edge of a display region where pixels are arranged. The frame region is a region not associated with display where pixels are not arranged. If two liquid crystal displays, for example, are arranged in a horizontal direction, the frame region is positioned in a joint therebetween so that continuity of display is inhibited, resulting in deterioration in display quality.

One of objectives of the following embodiments is to provide a display device in which a frame region is kept as narrow as possible. As a result, even if a plurality of such display devices are arranged, joints thereamong are not easy to visually recognize.

First Embodiment

A planar configuration and a cross-sectional configuration of a display device 100 according to the present embodiment, and a configuration of a display device 190 the area of which has been increased by arranging a plurality of display units 180 will be described with reference to the drawings.

[Planar Configuration]

Figure 2A:
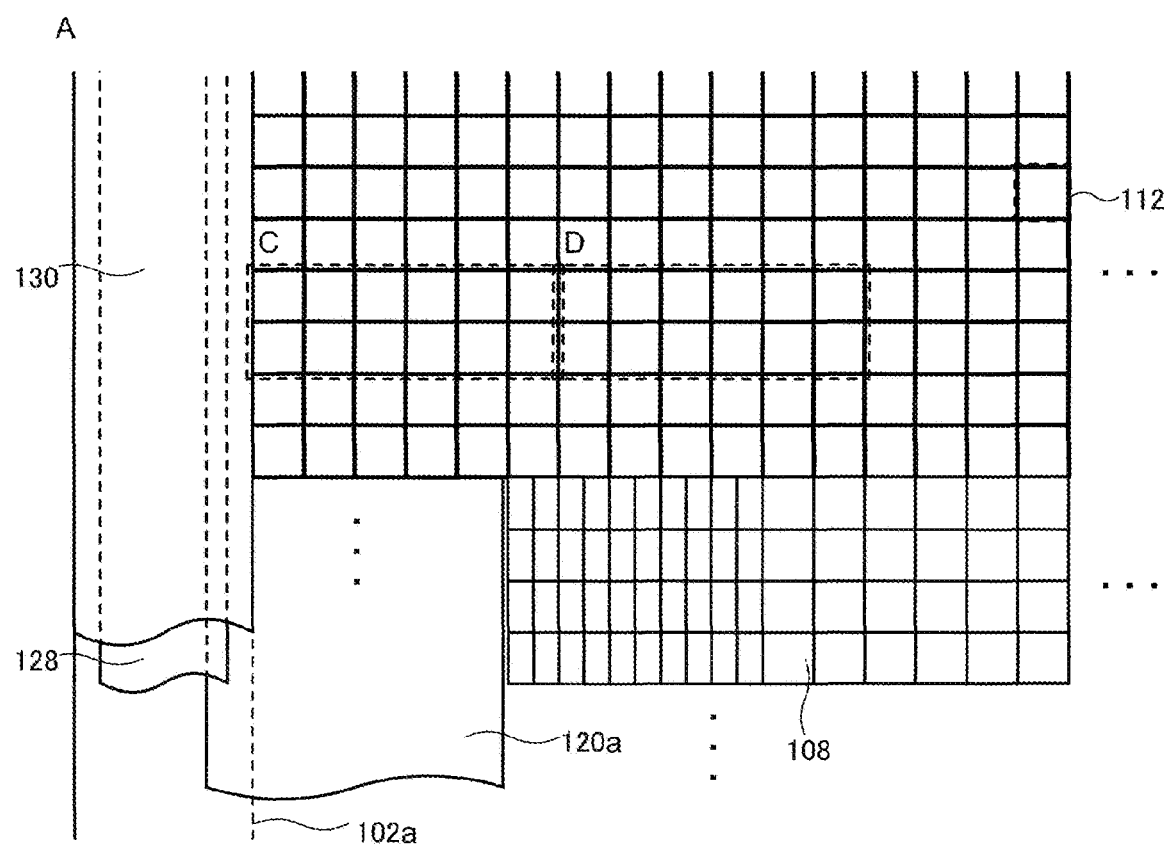
FIG. 2A is an enlarged plan view illustrating the configuration of the display device according to the first embodiment of the present invention.
Figure 2B:
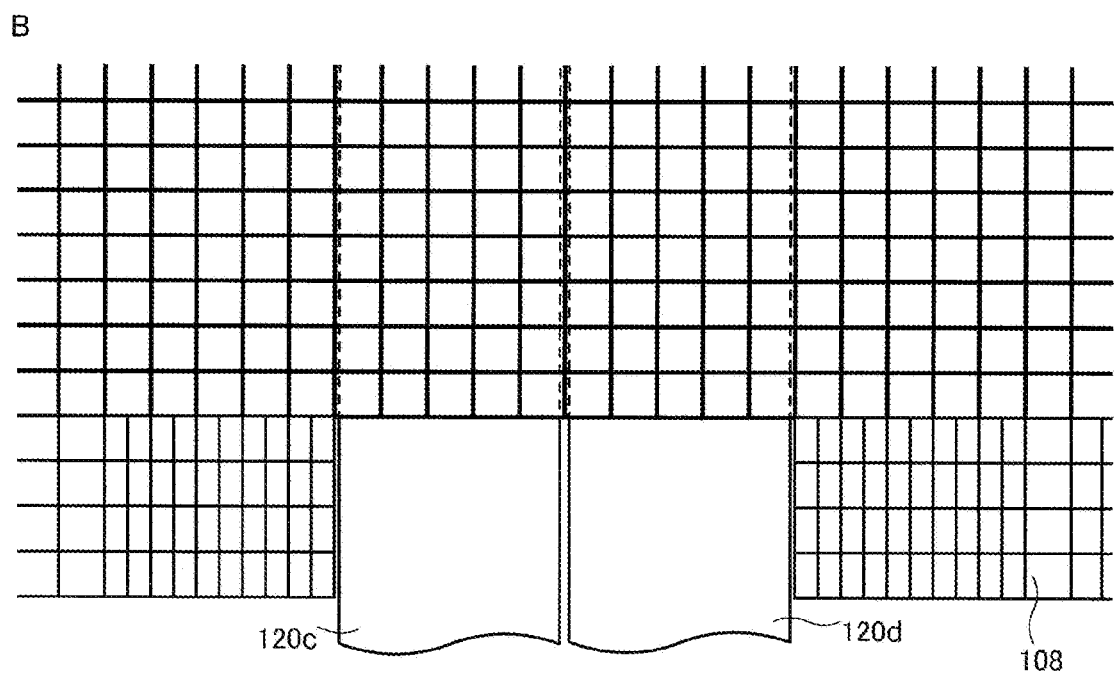
FIG. 2B is an enlarged plan view illustrating the configuration of the display device according to the first embodiment of the present invention.
Figure 3A:
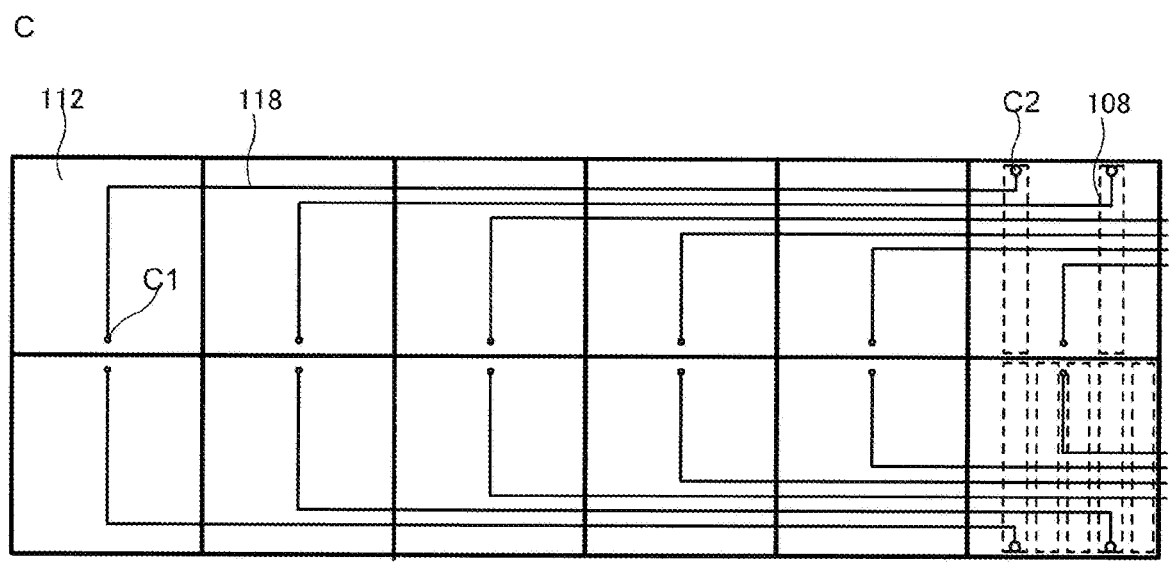
FIG. 3A is an enlarged plan view illustrating the configuration of the display device according to the first embodiment of the present invention.
Figure 3B:
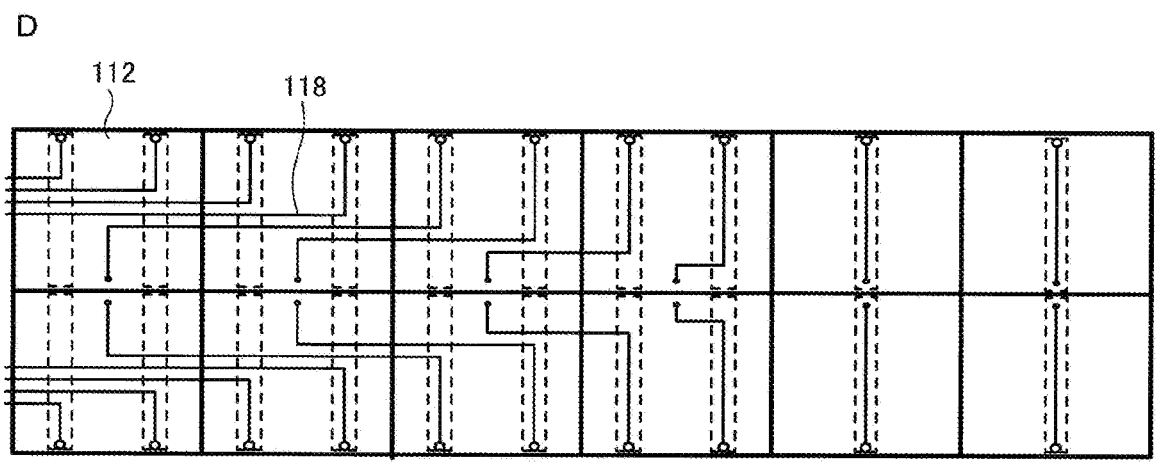
FIG. 3B is an enlarged plan view illustrating the configuration of the display device according to the first embodiment of the present invention.

FIG. 1 is a plan view illustrating a schematic configuration of the display device 100 according to the present embodiment. FIG. 2A is a plan view illustrating the vicinity of a region A illustrated in FIG. 1 in an enlarged manner. FIG. 2B is a plan view illustrating the vicinity of a region B illustrated in FIG. 1 in an enlarged manner. FIG. 3A is a plan view illustrating a pixel 106 within a region C illustrated in FIG. 2A in an enlarged manner. FIG. 3B is a plan view illustrating a pixel 106 within a region D illustrated in FIG. 2A in an enlarged manner.

The display device 100 according to the present embodiment includes a first substrate 102, a second substrate 104, a plurality of pixels 106, a first scanning signal line driving circuit 120a, a second scanning signal line driving circuit 120b, a third scanning signal line driving circuit 120c, a fourth scanning signal line driving circuit 120d, a video signal line driving circuit 122, a plurality of scanning signal lines 124, a plurality of video signal lines 126, a plurality of connection terminals 132, a sealing material 128, and a light shielding layer 130 in a planar configuration. The display device 100 is a reflection-type liquid crystal display. The first to fourth scanning signal line driving circuits and the video signal line driving circuit 122 may be each merely referred to as a driving circuit if not distinguished.

The first substrate 102 functions as a supporting member of a plurality of pixels 106. In the first substrate 102, a display region 102a is a region where the plurality of pixels 106 are arranged. The plurality of pixels 106 contribute to display of an image. The first substrate 102 has a rectangular shape. The first substrate 102 has a first side 102b, a second side 102c, a third side 102d, and a fourth side 102e. The second side 102c is a side opposing the first side 102b. The third side 102d is a side between the first side 102b and the second side 102c. The fourth side 102e is a side between the first side 102b and the second side 102c, and is a side opposing the third side 102d. As the first substrate 102, a glass substrate, an acrylic resin substrate, an alumina substrate, a polyimide substrate, or the like can be used.

The second substrate 104 is provided to oppose the first substrate 102 on an upper surface of the display region 102a. The second substrate 104 is fixed to the first substrate 102 with the sealing material 128 surrounding a peripheral portion of the second substrate 104. As the second substrate 104, a similar substrate to the first substrate 102 may be used.

Figure 4:
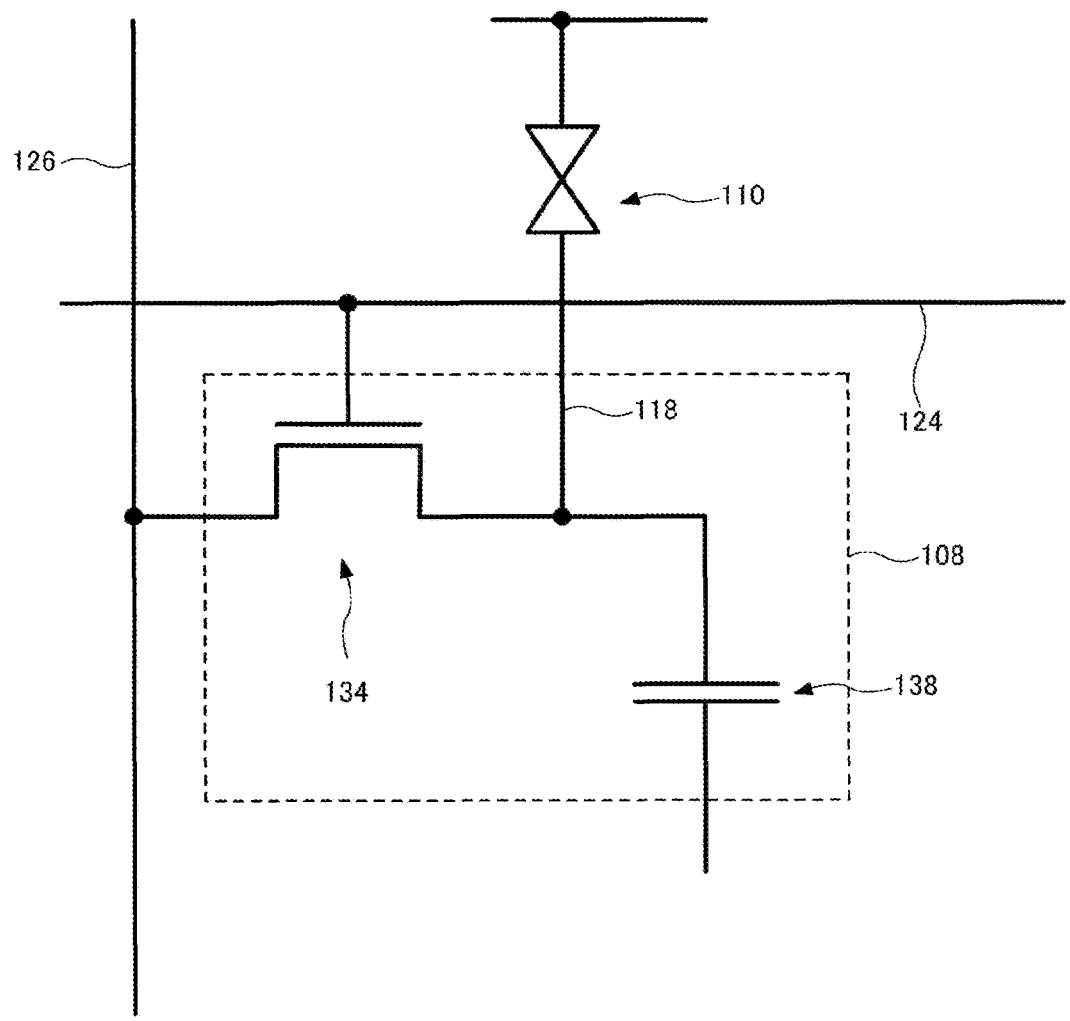
FIG. 4 is a circuit diagram illustrating a configuration of a pixel included in the display device according to the first embodiment of the present invention.

FIG. 4 is a circuit diagram illustrating a configuration of each of the plurality of pixels 106 included in the display device 100 according to the present embodiment. The pixel 106 includes a pixel circuit 108, a liquid crystal element 110, and a relay wiring 118, described below. The pixel circuit 108 includes a selection transistor 134 and a capacitor 138. The selection transistor 134 has its gate connected to the scanning signal lines 124, its source connected to the video signal lines 126, and its drain connected to the relay wiring 118. The selection transistor 134 controls a conductive state between the video signal line 126 and a pixel electrode 112 in the liquid crystal element 110 by an on/off operation.

The liquid crystal element 110 includes the pixel electrode 112, a liquid crystal layer 114, and a common electrode 116, as described in detail below. The liquid crystal element 110 has a layered structure in which the pixel electrode 112, the liquid crystal layer 114, and the common electrode 116 are stacked in this order. The pixel electrode 112 is connected to the relay wiring 118. The relay wiring 118 connects the drain of the selection transistor 134 and the pixel electrode 112.

The first scanning signal line driving circuit 120a is adjacent to the plurality of pixel circuits 108, and is arranged on the side of the first side 102b of the first substrate 102. The second scanning signal line driving circuit 120b is adjacent to the plurality of pixel circuits 108, and is arranged on the side of the second side 102c of the first substrate 102. The third scanning signal line driving circuit 120c is arranged between the first scanning signal line driving circuit 120a and the second scanning signal line driving circuit 120b. Each of the plurality of pixel circuits 108 respectively are corresponding to any one pixel 106 of a plurality of pixels 106. The plurality of pixel circuits 108 include a first pixel circuit and a second pixel circuit. The first pixel circuit is arranged in a region between the first scanning signal line driving circuit 120a and the third scanning signal line driving circuit 120c. The second pixel circuit is arranged in a region between the third scanning signal line driving circuit 120c and the second scanning signal line driving circuit 120b. In other words, the plurality of pixel circuits 108 are arranged with a gap in a region between the first scanning signal line driving circuit 120a and the second scanning signal line driving circuit 120b. The third scanning signal line driving circuit 120c is arranged in this gap. The fourth scanning signal line driving circuit 120d is arranged between the second scanning signal line driving circuit 120b and the third scanning signal line driving circuit 120c. More specifically, the fourth scanning signal line driving circuit 120d is arranged between the third scanning signal line driving circuit 120c and the second pixel circuit. In other words, the fourth scanning signal line driving circuit 120d is arranged in a gap provided in the plurality of pixel circuits 108.

Each of the first scanning signal line driving circuit 120a, the second scanning signal line driving circuit 120b, the third scanning signal line driving circuit 120c, and the fourth scanning signal line driving circuit 120d inputs a scanning signal to the plurality of scanning signal lines 124. That is, each of the first scanning signal line driving circuit 120a, the second scanning signal line driving circuit 120b, the third scanning signal line driving circuit 120c, and the fourth scanning signal line driving circuit 120d selects any pixel row in order via the plurality of scanning signal lines 124.

As illustrated in FIGS. 2A and 2B, at least a part of a region where each of the first scanning signal line driving circuit 120a, the second scanning signal line driving circuit 120b, the third scanning signal line driving circuit 120c, and the fourth scanning signal line driving circuit 120d is arranged overlaps some of the plurality of pixel electrodes 112.

As illustrated in FIG. 2A, for example, in the present embodiment, a part of the first scanning signal line driving circuit 120a overlaps the pixel electrodes 112 in five columns.

The plurality of pixel circuits 108 are arranged in a layer below a layer where the pixel electrodes 112 are arranged. In the present embodiment, all the plurality of pixel electrodes 112 are designed to be arranged in a predetermined period. On the other hand, the pixel circuits 108 in ten columns adjacent to the first scanning signal line driving circuit 120a among the plurality of pixel circuits 108 arranged within the display region 102a are arranged in half of the period of the pixel electrodes 112 in a row direction.

As illustrated in FIGS. 3A and 3B, the pixel electrodes 112 in five columns overlapping the first scanning signal line driving circuit 120a are respectively connected to the pixel circuits 108 in five columns adjacent to the first scanning signal line driving circuit 120a via the relay wirings 118. The relay wiring 118 is arranged within one pixel row. The relay wiring 118 includes a portion extending in a column direction of the pixels 106 from a region C1, a portion extending in a row direction of the pixels 106, and a portion extending in the column direction of the pixels 106 from a region C2. In each of the plurality of pixels 106, the relay wiring 118 is arranged within one pixel row but may extend over a plurality of pixel rows adjacent thereto.

That is, the display device 100 according to the present embodiment presupposes the reflection-type liquid crystal display. Thus, the pixel electrodes 112 having a light reflection property (hereinafter also referred to as reflective pixel electrodes) and a layout of the pixel circuits 108 arranged in a layer located therebelow can be almost independently designed. That is, in one of the pixels 106, the pixel electrode 112 need not be arranged while overlapping the pixel circuit 108. Thus, the pixel electrode 112 can be arranged while overlapping at least a part of a region occupied by the first scanning signal line driving circuit 120a. Thus, the display region 102a is provided while overlapping at least a part of the region occupied by the first scanning signal line driving circuit 120a. Therefore, the frame of the display device 100 can be narrowed.

As illustrated in FIG. 2B, for example, in the present embodiment, each of the third scanning signal line driving circuit 120c and the fourth scanning signal line driving circuit 120d overlaps the pixel electrodes 112 in five columns.

In the present embodiment, all the plurality of pixel electrodes 112 arranged within the display region 102a are designed to be arranged in a predetermined period, as described above. The pixel circuits 108 in ten columns adjacent to the third scanning signal line driving circuit 120c among the plurality of pixel circuits 108 arranged within the display region 102a are arranged in half of the period of the pixel electrodes 112 in the row direction.

The pixel electrodes 112 in five columns overlapping the third scanning signal line driving circuit 120c are respectively connected to the pixel circuits 108 in five rows adjacent to the third scanning signal line driving circuit 120c.

From the above-described reason, the pixel electrodes 112 having a light reflection property and a layout of the pixel circuits 108 arranged in a layer located therebelow can be almost independently designed. That is, in the one pixel 106, the pixel electrode 112 need not be arranged while overlapping the pixel circuit 108. That is, the pixel electrode 112 is arranged while overlapping a region occupied by the third scanning signal line driving circuit 120c. Thus, continuity of display is not inhibited due to arrangement of the third scanning signal line driving circuit 120c within the display region 102a.

In the first substrate 102, a region between the first scanning signal line driving circuit 120a and the third scanning signal line driving circuit 120c is a first region 102g, and a region between the fourth scanning signal line driving circuit 120d and the second scanning signal line driving circuit 120b is a second region 102h. That is, the plurality of pixel circuits 108 include a first pixel circuit arranged in a first region 102g between the first scanning signal line driving circuit 120a and the third scanning signal line driving circuit 120c. And the plurality of pixel circuits 108 include a second pixel circuit arranged in a second region 102h between the fourth scanning signal line driving circuit 120d and the second scanning signal line driving circuit 120b.

The plurality of scanning signal lines 124 are arranged in the first region 102g and the second region 102h. Each of the plurality of scanning signal lines 124 is connected to any of the first scanning signal line driving circuit 120a, the second scanning signal line driving circuit 120b, the third scanning signal line driving circuit 120c, and the fourth scanning signal line driving circuit 120d. In the present embodiment, each of the plurality of scanning signal lines 124 arranged in the first region 102g extends in a horizontal direction. Each of the plurality of scanning signal lines 124 has its one side connected to the first scanning signal line driving circuit 120a and its other side connected to the third scanning signal line driving circuit 120c. Further, each of the plurality of scanning signal lines 124 is connected to the pixel circuits 108 arranged within the same pixel row among the plurality of pixel circuits 108 arranged in a matrix shape. Similarly, each of the plurality of scanning signal lines 124 arranged in the second region 102h has its one side connected to the fourth scanning signal line driving circuit 120d and its other side connected to the second scanning signal line driving circuit 120b.

Each of the plurality of scanning signal lines 124 inputs a scanning signal to the plurality of pixels 106. The present embodiment presupposes a so-called both-side driving display device. The both-side driving display device has scanning signal line driving circuits arranged on both sides of a plurality of scanning signal lines 124. And these scanning signal line driving circuits feed same waveform to the plurality of pixels 106, respectively.

In this case, an effective length of the scanning signal lines 124 becomes half of and a load on the scanning signal lines 124 to be driven become half of those when the scanning signal line driving circuit is arranged only on one side of the scanning signal lines 124. Thus, for the size of a buffer circuit in a final stage of the scanning signal line driving circuit, half of that when the scanning signal line driving circuit is arranged on one side is sufficient. The area occupied by the scanning signal line driving circuit is reduced. Therefore, the frame of the display device 100 can be narrowed.

A layout of the relay wirings 118 is restricted by a design rule for defining their dimensions and distances thereamong. By this restriction, the width of the pixel electrode 112, which can be arranged while overlapping the scanning line driving circuit, is limited. However, according to the display device 100, the area occupied by each of the scanning signal line driving circuits distributed among a plurality of regions is smaller than that occupied by conventional scanning signal line driving circuits not distributed among a plurality of regions from the above-described reasons. Each of the scanning signal line driving circuits distributed among the plurality of regions does not overlap the pixel electrodes 112. Thus, a frame region not associated with display is reduced. Therefore, the frame of the display device 100 can be further narrowed.

Each of the plurality of video signal lines 126 extends in a vertical direction, and has its one side connected to the video signal line driving circuit 122. Further, each of the plurality of video signal lines 126 is connected to the pixel circuits 108 arranged within the same pixel column among the plurality of pixel circuits 108 arranged in a matrix shape.

The video signal line driving circuit 122 is arranged on the side of the third side 102d of the first substrate 102. The video signal line driving circuit 122 inputs a video signal to the plurality of video signal lines 126. That is, the video signal line driving circuit 122 matches selection of a pixel row, to supply a voltage corresponding to a video signal in the selected pixel row to the plurality of pixels 106 via each of the plurality of video signal lines 126.

The video signal line driving circuit 122 inputs the video signal to the plurality of pixels 106 (a pixel corresponding to the first pixel circuit) arranged in the first region 102g and the plurality of pixels 106 (a pixel corresponding to the second pixel circuit) arranged in the second region 102h via each of the plurality of video signal lines 126.

The sealing material 128 fixes the second substrate 104 to the first substrate 102. In the present embodiment, the sealing material 128 overlaps a part of each of the first scanning signal line driving circuit 120a and the second scanning signal line driving circuit 120b.

The light shielding layer 130 is arranged on the side of the second substrate 104. The light shielding layer 130 is arranged in a peripheral edge of the second substrate 104, and overlaps the sealing material 128 in a planar view (i.e., as viewed in a direction perpendicular to the upper surface of the first substrate 102). In the present embodiment, the light shielding layer 130 overlaps a part of the first scanning line driving circuit 120a in a planar view. The light shielding layer 130 may be spaced apart from the first scanning line driving circuit 120a in a planar view. The light shielding layer 130 does not overlap any one of the pixel electrodes 112.

The plurality of connection terminals 132 are arranged on the side of the third side 102d of the first substrate 102 and outside the second substrate 104. A region where the plurality of connection terminals 132 are arranged is a terminal region 102f. A wiring substrate (not illustrated) is connected to the plurality of connection terminals 132. The wiring substrate connects equipment for outputting a video signal, a power supply, or the like and the display device 100. Respective contacts with the plurality of connection terminals 132 connected to the wiring substrate are exposed to the outside.

A planar structure of the display device 100 according to the present embodiment has been described above. The display device 100 according to the present embodiment has a configuration in which the scanning signal line driving circuits are distributed among a plurality of regions. The plurality of scanning signal line driving circuits are arranged at ends of the display device 100 and within the display region 102a. The area occupied by each of the scanning signal line driving circuits distributed among the plurality of regions is smaller than the area occupied by the conventional scanning signal line driving circuits not distributed among a plurality of regions. Therefore, the frame of the display device 100 can be further narrowed.

The display device 100 according to the present embodiment presupposes a reflection-type liquid crystal display. Thus, the pixel electrodes 112 having a light reflection property and a layout of the pixel circuits 108 arranged in a layer located therebelow can be independently designed within a range of a design rule. The pixel electrodes 112 are arranged while overlapping at least a part of a region occupied by the scanning signal line driving circuit. Therefore, the frame of the display device 100 can be further narrowed.

At this time, the pixel electrodes 112 are arranged while overlapping the scanning signal line driving circuit arranged within the display region 102a. Thus, continuity of display is not inhibited within the display region 102a.

[Cross-Sectional Configuration]

Figure 5:
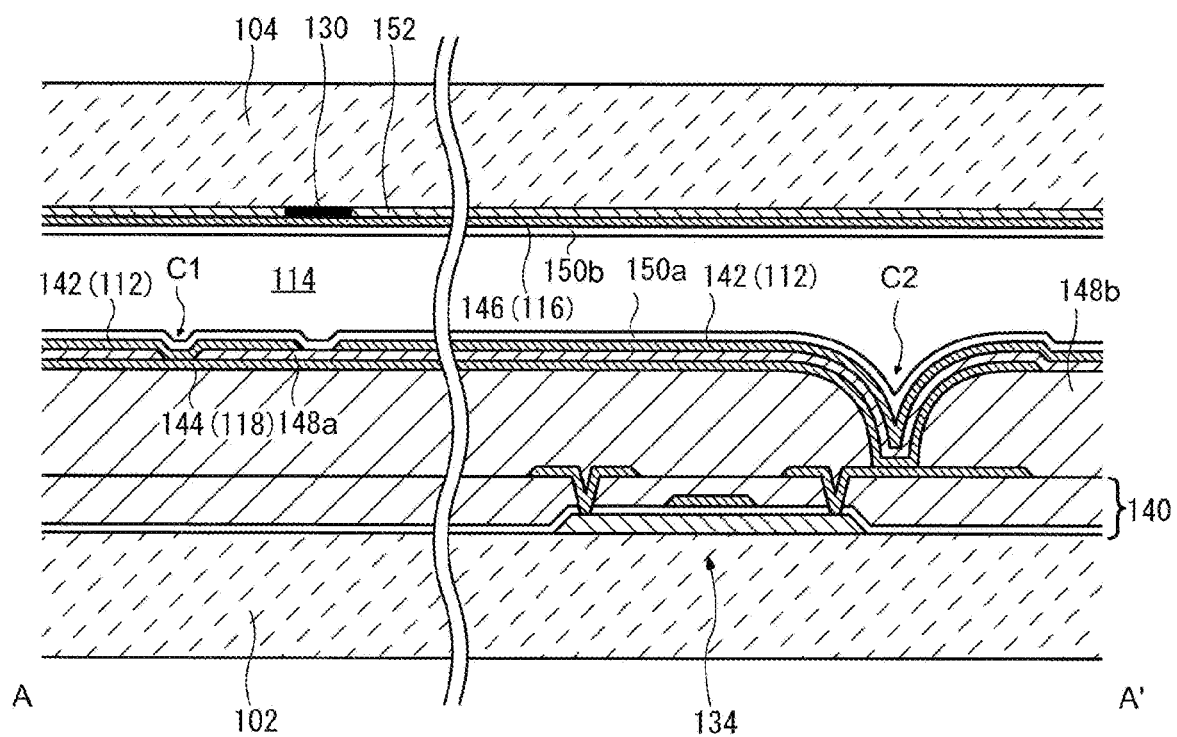
FIG. 5 is a cross-sectional view illustrating the configuration of the display device according to the first embodiment of the present invention.

FIG. 5 is a cross-sectional view along the relay wiring 118 joining the region C1 and the region C2 illustrated in FIG. 3A. The display device 100 includes the first substrate 102, a circuit layer 140, a pixel electrode layer 142, a relay wiring layer 144, a common electrode layer 146, the second substrate 104, orientation films 150a and 150b, and the liquid crystal layer 114. The orientation films 150a and 150b are referred to as an orientation film 150 when not particularly distinguished.

The first substrate 102 functions as a supporting member of the plurality of pixels 106. As a material for the first substrate 102, a glass substrate, an acrylic resin substrate, an alumina substrate, or a polyimide substrate, for example, can be used.

The circuit layer 140 is arranged on one surface of the first substrate 102. The circuit layer 140 includes the plurality of pixel circuits 108, the plurality of scanning signal lines 124, the plurality of video signal lines 126, the first scanning signal line driving circuit 120a, the second scanning signal line driving circuit 120b, the third scanning signal line driving circuit 120c, the fourth scanning signal line driving circuit 120d, the video signal line driving circuit 122.

The plurality of pixel circuits 108 are respectively provided in the plurality of pixels 106. A detailed circuit configuration of the pixel circuits 108 has already been described. In FIG. 5, the selection transistor 134 within the pixel circuit 108 is illustrated.

The pixel electrode layer 142 is arranged in a layer above the circuit layer 140. The pixel electrode layer 142 includes the plurality of pixel electrodes 112. In the present embodiment, the plurality of pixel electrodes 112 are arranged in a matrix shape, as can be seen from FIGS. 2A, 2B, 3A, and 3B. Further, all the pixel electrodes 112 arranged in a row direction or a column direction are designed to be arranged in a predetermined period.

A material for the plurality of pixel electrodes 112 needs to include a metal having a light reflection property to reflect external light accepted in the liquid crystal element 110 toward the common electrode 116. As a metal having a light reflection property and having a high reflectivity, silver (Ag), for example, is preferably used.

The relay wiring layer 144 is arranged between the circuit layer 140 and the pixel electrode layer 142. The relay wiring layer 144 includes a relay wiring 118 for connecting the pixel circuit 108 provided in each of the plurality of pixels 106 and each of the plurality of pixel electrodes 112.

A first insulating layer 148a is arranged between the relay wiring layer 144 and the pixel electrode layer 142. The relay wiring 118 and the pixel electrode 112 are connected to each other via the first contact hole C1 provided in the first insulating layer 148a. A second insulating layer 148b is arranged between the relay wiring 118 and the circuit layer 140. The intermediate wiring layer 144 and the drain of the selection transistor 134 are connected to each other via a second contact hole C2 provided in the second insulating layer 148b.

The common electrode layer 146 is arranged on a surface, on the side of the first substrate 102, of the second substrate 104. The common electrode layer 146 includes the common electrode 116 arranged over a region, where the plurality of pixels 106 are arranged, of the display region 102a. As a material for the common electrode 116, a material having a translucent property and having a conductive property is preferably used for the common electrode 116 to transmit external light accepted in the liquid crystal element 110 and reflected by the pixel electrode 112. Examples of the material for the common electrode 116 preferably include indium tin oxide (tin oxide-added indium oxide) ITO and indium zinc oxide (indium oxide and zinc oxide) IZO. Alternatively, as the common electrode 116, a metal layer having a thickness enough to transmit emitted light may be used.

The second substrate 104 is arranged to oppose the first substrate 102. The second substrate 104 is fixed to the first substrate 102 with the sealing material 128 surrounding the display region 102a.

A color filter 152 and the light shielding layer 130 are arranged on a surface, on the side opposing the first substrate 102, of the second substrate 104. The color filter 152 is arranged at a position opposing each of the plurality of pixel electrodes 112. The light shielding layer 130 is arranged at a position for zoning each of the plurality of pixel electrodes 112.

The orientation film 150 is arranged on the side of each of the first substrate 102 and the second substrate 104. The orientation film 150a on the side of the first substrate 102 is arranged in a layer above the pixel electrode layer 142. The orientation film 150b on the side of the second substrate 104 is arranged on a surface, on the side of the first substrate 102, of the common electrode layer 146. The orientation film 150 is provided to orient liquid crystal molecules included in the liquid crystal layer 114 in a predetermined direction.

The liquid crystal layer 114 is sandwiched between the pixel electrode layer 142 and the common electrode layer 146. The liquid crystal layer 114 overlaps each of the third scanning signal line driving circuit 120c and the fourth scanning signal line driving circuit 120d.

A cross-sectional configuration of the display device 100 according to the present embodiment has been described above. The display device 100 according to the present embodiment presupposes a reflection-type liquid crystal display. Thus, the pixel electrodes 112 having a light reflection property and a layout of the pixel circuits 108 arranged in a layer located therebelow can be independently designed within a range of a design rule. The pixel electrodes 112 are arranged while overlapping at least a part of a region occupied by the scanning signal line driving circuit. Therefore, the frame of the display device 100 can be further narrowed.

A configuration of the display device 100 according to the present embodiment has been described above. In the present embodiment, the display device 100 is a so-called both-side driving display device. The scanning signal line driving circuits are respectively arranged on both sides of the plurality of scanning signal lines 124. The scanning signal line driving circuits respectively feed scanning signals having the same waveform from both sides of the scanning signal lines 124 to the plurality of pixels 106. However, the present invention is applicable to the both-side driving display device without being limited to only this.

As another example, the present invention is also applicable to a so-called one-side driving display device. The one-side driving display device has scanning signal line driving circuits arranged on both sides of a plurality of scanning signal lines 124. And each of the scanning signal line driving circuits feed a scanning signal from corresponding one side of the scanning signal lines 124 to a plurality of pixels 106. In this case, one of the scanning signal line driving circuits feeds a scanning signal to the plurality of pixels 106 connected to the scanning signal lines 124 in odd rows, for example. The other scanning signal line driving circuit feeds a scanning signal to the plurality of pixels 106 connected to the scanning signal lines 124 in even rows.

In this case, the number of scanning signal lines 124 to be driven by each of the scanning signal line driving circuits on both sides becomes half of that when the scanning signal line driving circuit is arranged on one side. Thus, the area occupied by each of the scanning signal line driving circuits on both sides is more reduced than that when the scanning signal line driving circuit is arranged on one side. Therefore, the frame of a display device 100 can be narrowed.

In the present embodiment, the four scanning signal line driving circuits, i.e., the first scanning signal line driving circuit 120a, the second scanning signal line driving circuit 120b, the third scanning signal line driving circuit 120c, and the fourth scanning signal line driving circuit 120d are arranged. However, the number of scanning signal line driving circuits is not limited to four but may be three or five or more.

Figure 6:
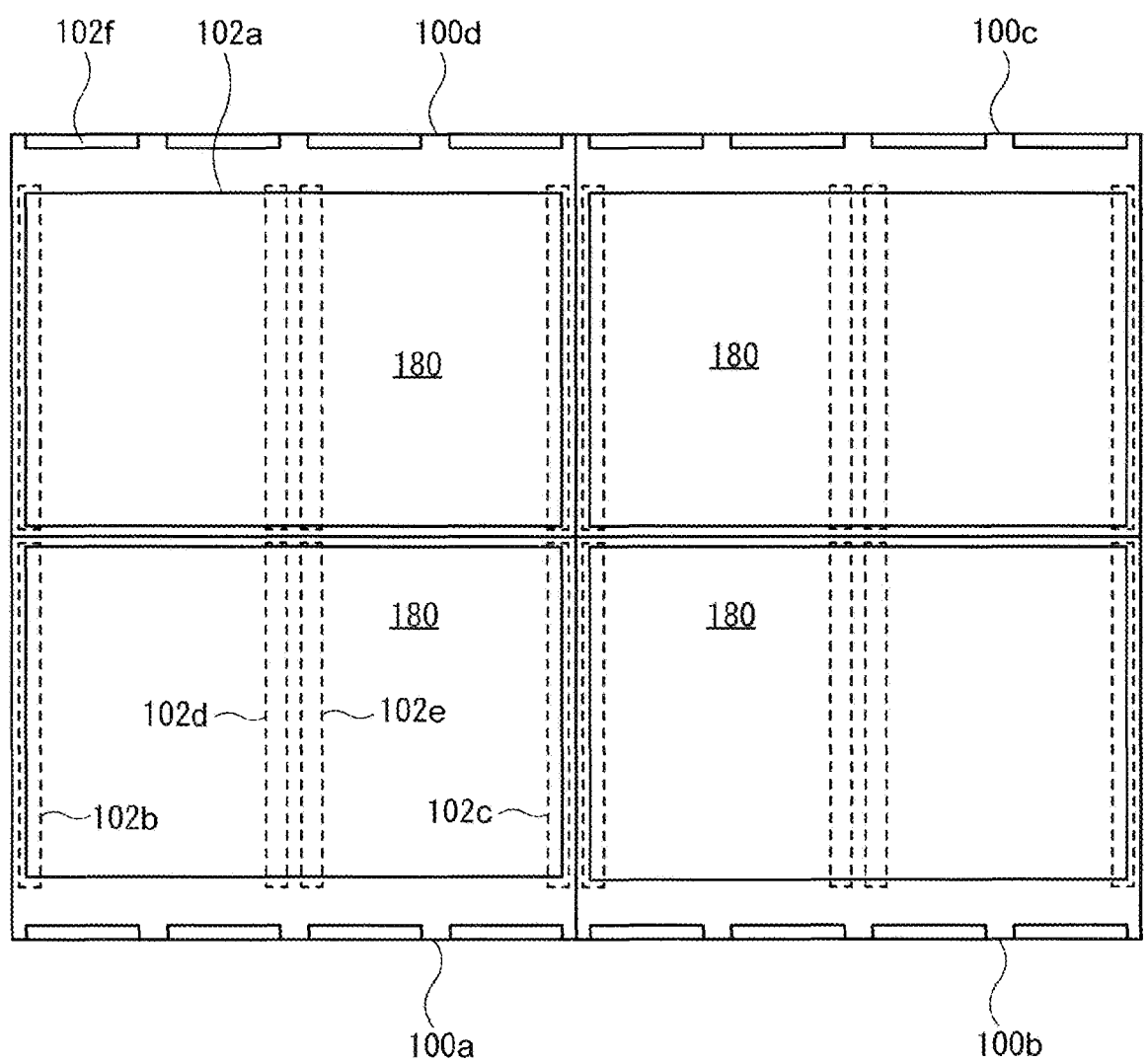
FIG. 6 is a plan view illustrating a configuration of a display device having a plurality of display devices according to the first embodiment of the present invention arranged therein side by side.

FIG. 6 is a plan view illustrating a configuration of a display device 190 having four display units 180. The display unit 180 has the same configuration with the display device 100. The display device 190 includes a frame region at a peripheral edge of each of the four display units 180 (may also be referred to as a "peripheral region"). The frame region is a region not associated with display, and the width of the frame region corresponds to the width of a light shielding layer 130. In the display device 190, regions not associated with display respectively exist along joints among the four display units 180. The display unit 180 according to the present embodiment enables the frame region to be more reduced than in a conventional example. Therefore, the regions not associated with display along the joints among the four display units 100 becomes difficult to visually recognize. Accordingly, a screen of the display device 190 is increased without continuity of display being inhibited and a display quality deteriorating.

Second Embodiment

A configuration of a display device 200 according to the present embodiment will be described with reference to the drawings. FIG. 1 used in the description of the display device 100 according to the first embodiment is also common in the display device 200 according to the present embodiment. The display device 200 according to the present embodiment differs from the display device 100 according to the first embodiment in a configuration of a pixel 106.

Figure 7A:
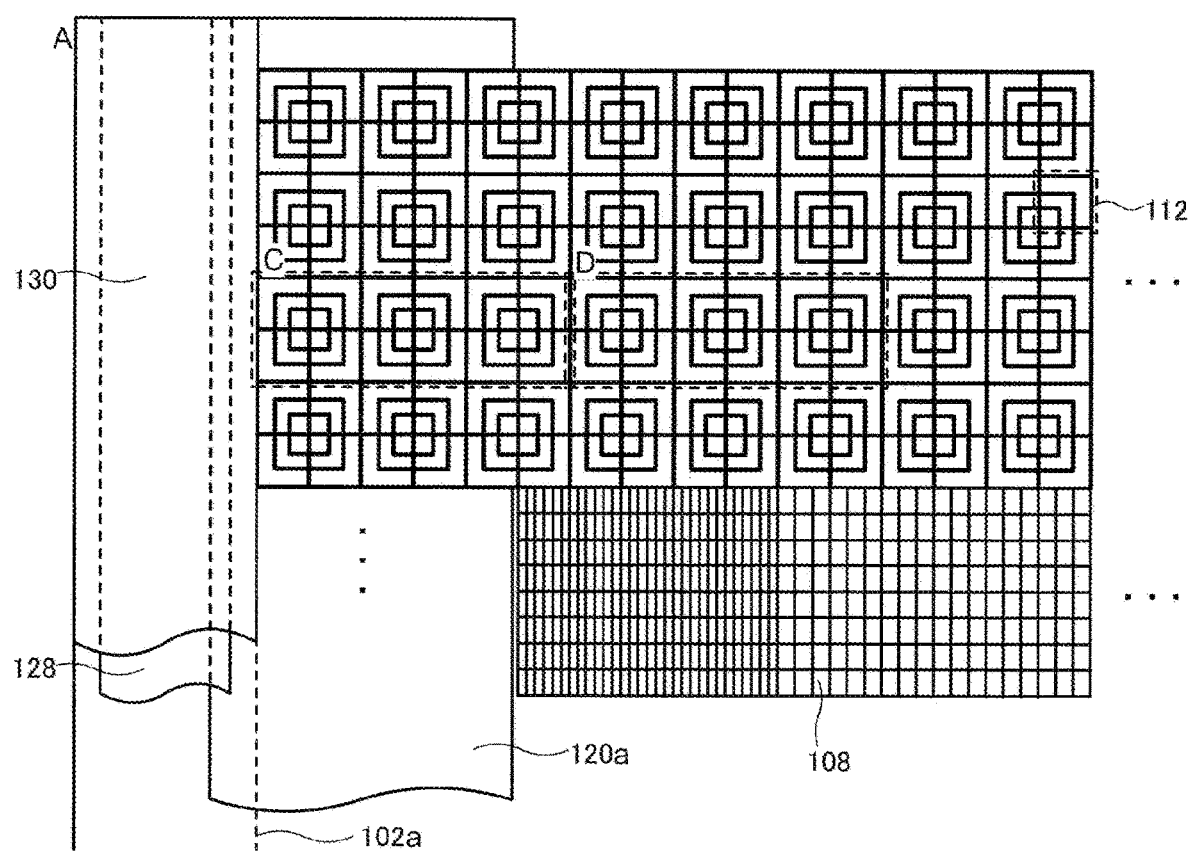
FIG. 7A is an enlarged plan view illustrating a configuration of a display device according to a second embodiment of the present invention.
Figure 7B:
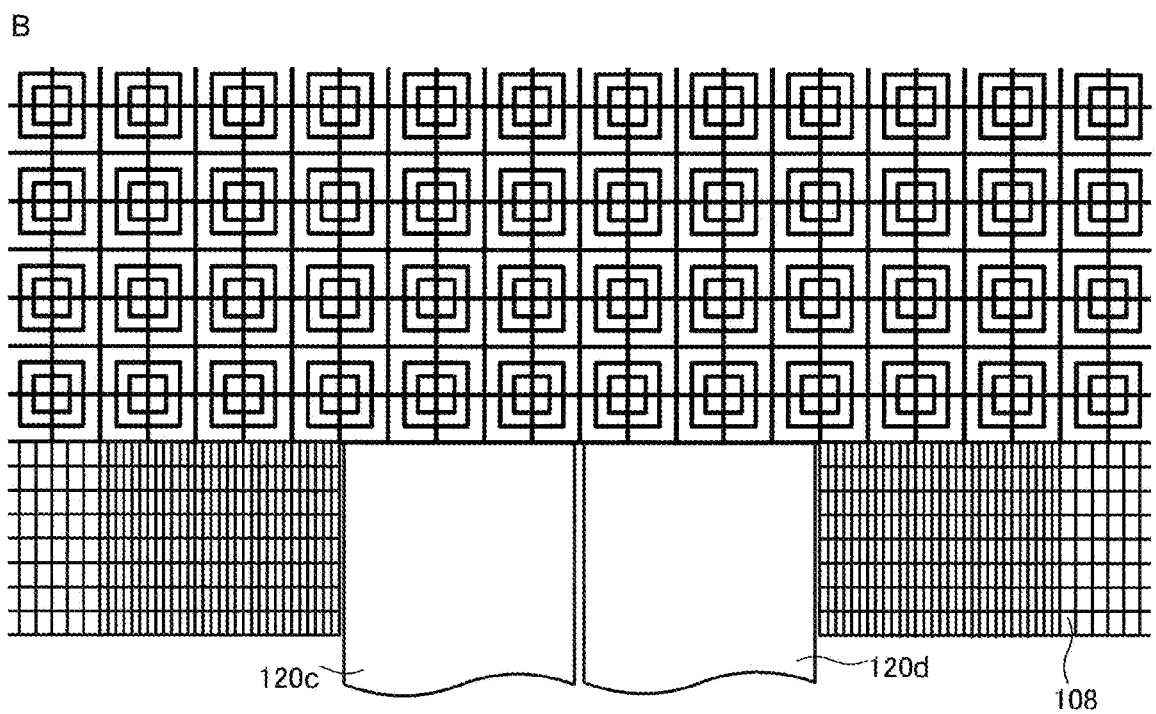
FIG. 7B is an enlarged plan view illustrating the configuration of the display device according to the second embodiment of the present invention.
Figure 10A:
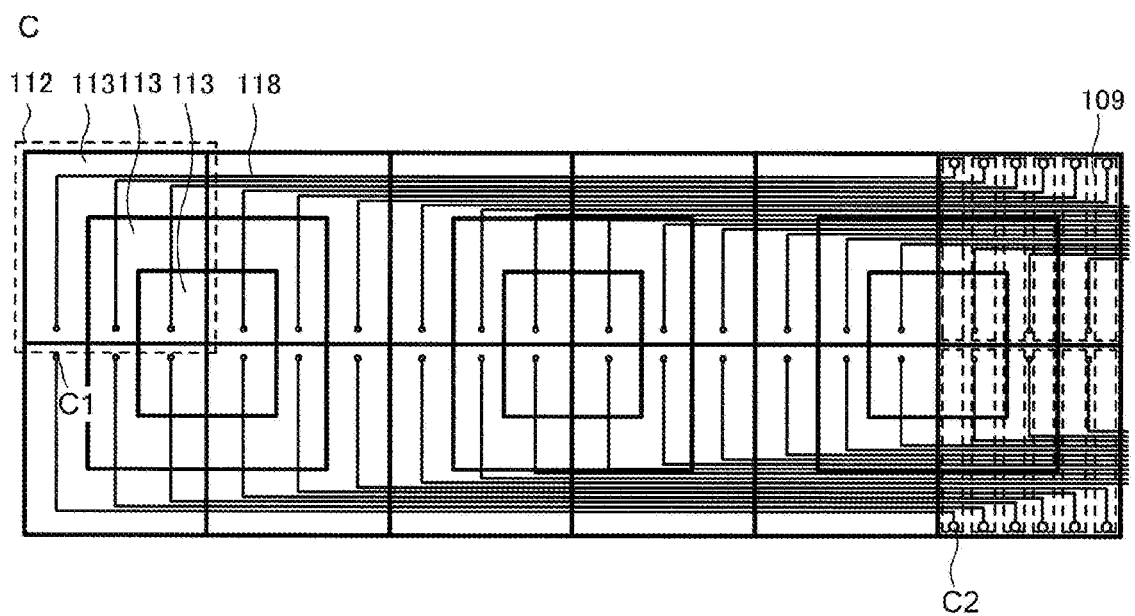
FIG. 10A is a plan view illustrating a pixel within a region C illustrated in FIG. 7A in an enlarged manner.
Figure 10B:
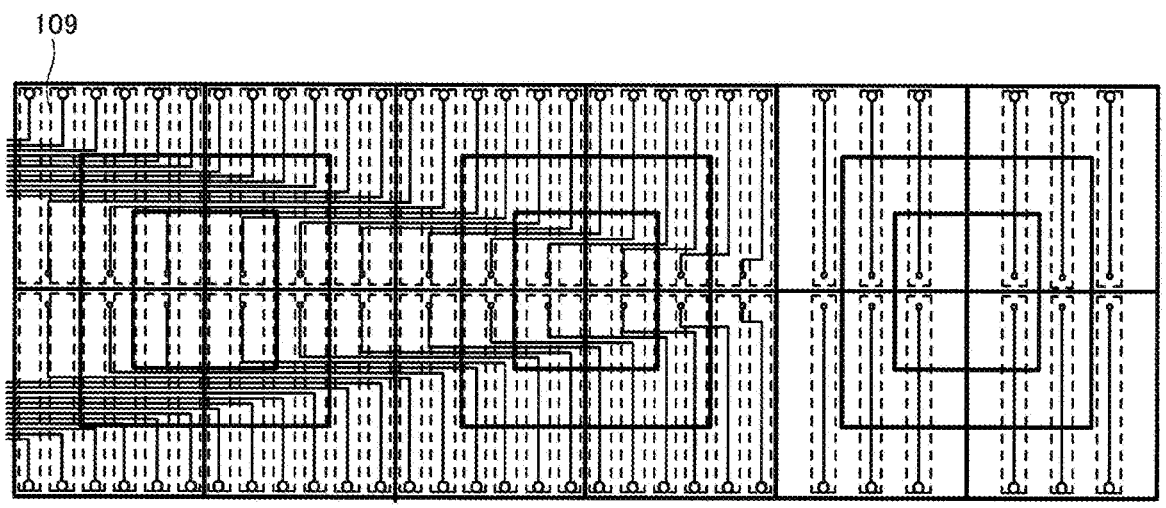
FIG. 10B is a plan view illustrating a pixel within a region D illustrated in FIG. 7B in an enlarged manner.

FIG. 7A is a plan view illustrating the vicinity of a region A illustrated in FIG. 1 in an enlarged manner. FIG. 7B is a plan view illustrating the vicinity of a region B illustrated in FIG. 1 in an enlarged manner. FIG. 10A is a plan view illustrating a pixel 106 within a region C illustrated in FIG. 7A in an enlarged manner. FIG. 10B is a plan view illustrating a pixel 106 within a region D illustrated in FIG. 7A in an enlarged manner.

The display device 200 according to the present embodiment presupposes a so-called MIP (Memory in Pixel) driving display device. In MIP driving display device, each of a plurality of pixels 106 has a memory storing information about display. Further, in the display device 200 according to the present embodiment, an area gradation method is used.

With adoption of an MIP driving method, each of a first scanning signal line driving circuit 120a, a second scanning signal line driving circuit 120b, a third scanning signal line driving circuit 120c, and a fourth scanning signal line driving circuit 120d includes a polarity inversion driving circuit.

Figure 8:
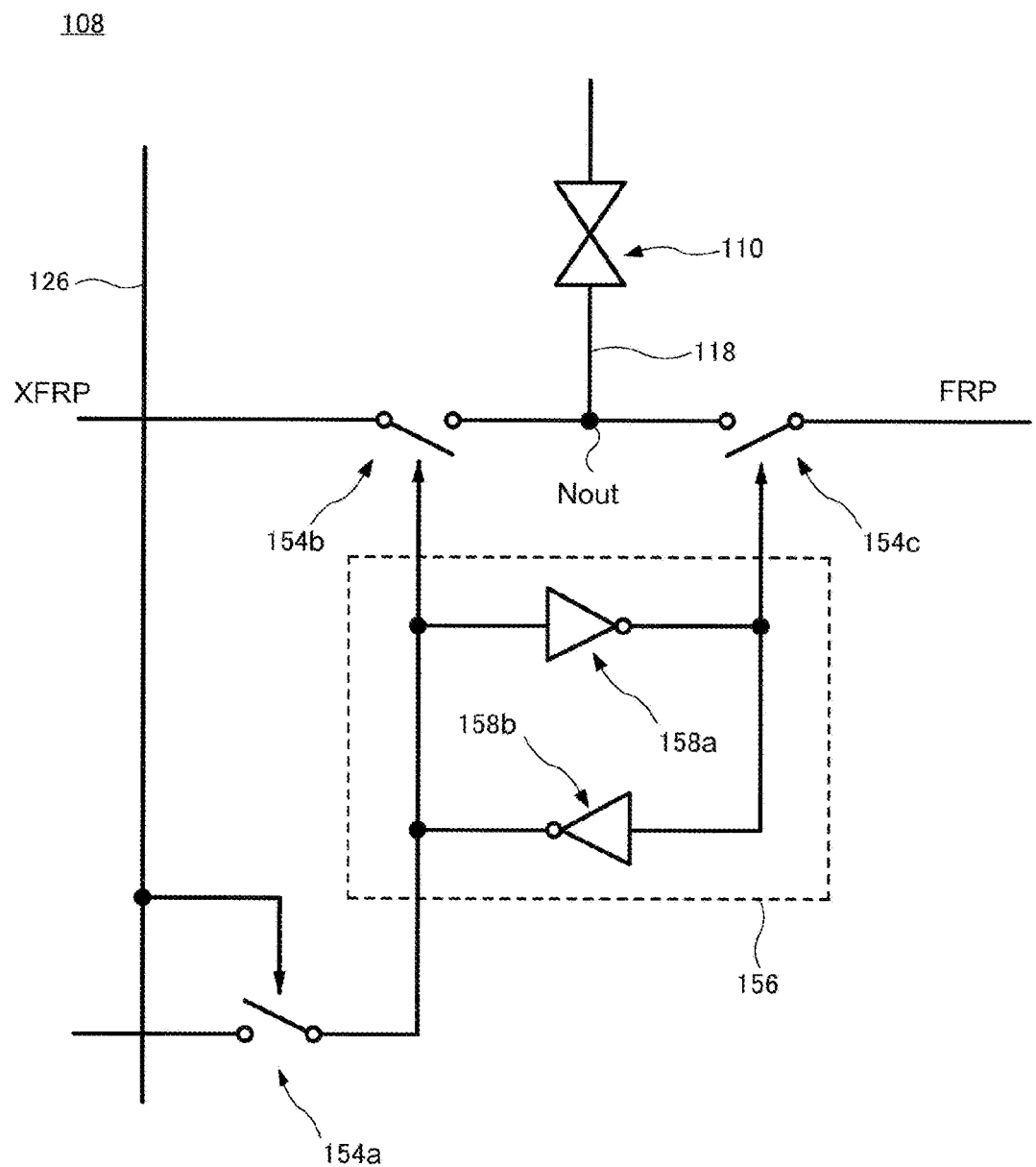
FIG. 8 is a circuit diagram illustrating a configuration of a pixel included in the display device according to the second embodiment of the present invention.
Figure 9:
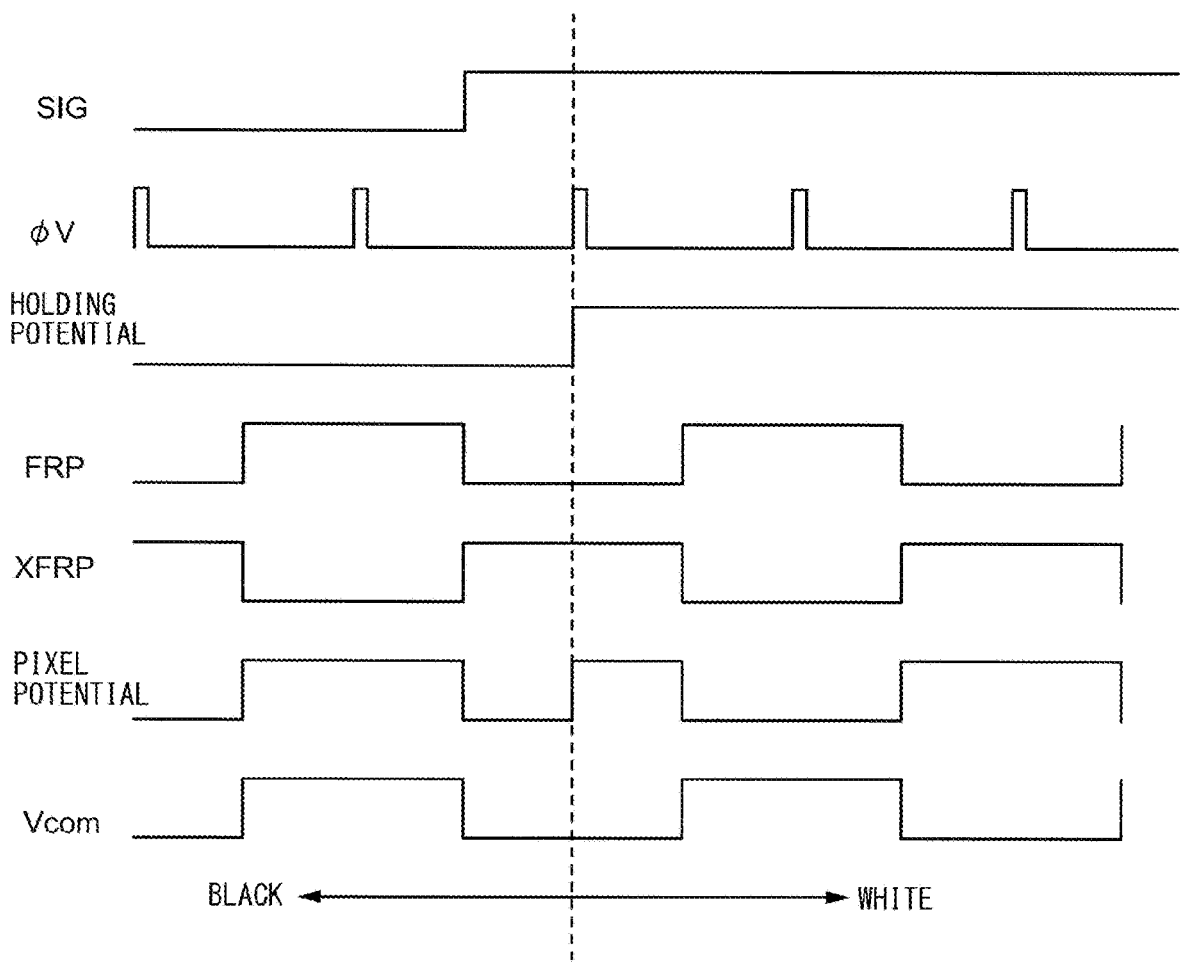
FIG. 9 is a timing chart illustrating an operation of the pixel included in the display device according to the second embodiment of the present invention.

FIG. 8 is a circuit diagram illustrating one example of a circuit configuration of a pixel circuit 108 using the MIP driving method. FIG. 9 is a timing chart illustrating an operation of an MIP-type pixel 106.

As illustrated in FIG. 8, each of the plurality of pixels 106 includes three switching elements 154a to 154c, a latch section 156, and a liquid crystal element 110.

The switching element 154a has its end connected to a video signal line 126, and is turned on when a scanning signal is fed thereto from a scanning signal line driving circuit and accepts a video signal to be fed via the video signal line 126. The latch section 156 includes inverters 158a and 158b respectively connected in parallel in opposite directions to each other, and holds a potential corresponding to the video signal accepted by the switching element 154a.

Either one of the switching elements 154b and 154c is turned on depending on the polarity of a potential held in the latch section 156. The switching elements 154b and 154c respectively feed a control pulse FRP or a control pulse XFRP to a pixel electrode 112 in a liquid crystal element 110 when turned on. The control pulse FRP has the same phase as that of the common potential. The control pulse XFRP has an opposite phase to that of the common potential. A node connected respective one terminals of the switching elements 154b and 154c in common to is referred to as an output node $N_{out}$.

As can be seen from FIG. 9, when the potential held in the latch section 156 has a negative polarity, a potential of the pixel electrode 112 (a pixel potential) is in phase with the potential of the common electrode 116. Therefore, the pixel 106 is displayed in black. When the potential held in the latch section 156 has a positive polarity, the potential of the pixel electrode 112 is opposite in phase to the potential of the common electrode 116. Thus, the pixel 106 is displayed in white.

An area gradation method will be described below. The display device 200 according to the present embodiment adopts an area gradation method for dividing the pixel electrode 112 into a plurality of sub-pixel electrodes 113 each weighted depending on the area thereof. In the area gradation method, the potential held in the latch section 156 is supplied to the plurality of sub-pixel electrodes 113 each weighted depending on the area thereof, to represent a plurality of gray levels by the combination of the sub-pixel electrodes 113.

An area gradation method will be specifically described below. The area gradation method is a gradation representation method for representing $2^N$ gray levels by N sub-pixel electrodes 113 each weighted so that an area ratio is $2^0:2^1:2^2: \ldots :2^{N-1}$.

In the display device 200 according to the present embodiment, an area gradation method for representing eight gray levels by three bits by weighting three sub-pixel electrodes 113 at an area ratio of 1:2:4 is adopted.

As illustrated in FIG. 7A, for example, a part of the first scanning signal line driving circuit 120a also overlaps the sub-pixel electrodes 113 belonging to the pixels 106 in five columns in the present embodiment.

A plurality of pixel circuits 108 are arranged in a layer below a layer where the pixel electrodes 112 are arranged. In the present embodiment, all a plurality of pixel electrodes 112 are designed to be arranged in a predetermined period. On the other hand, the pixel circuits 108 in ten columns adjacent to the first scanning signal line driving circuit 120a among the plurality of pixel circuits 108 arranged within a display region 102a are arranged in half of the period of the pixel electrodes 112 in a row direction.

As illustrated in FIGS. 10A and 10B, the sub-pixel electrodes 113 belonging to the pixels 106 in five columns overlapping the first scanning signal line driving circuit 120a are respectively connected to sub-pixel circuits 109 belonging to the pixels 106 in five columns adjacent to the first scanning signal line driving circuit 120a via relay wirings 118.

As illustrated in FIG. 7B, for example, each of the third scanning signal line driving circuit 120c and the fourth scanning signal line driving circuit 120d overlaps the sub-pixel electrodes 113 belonging to the pixels 106 in five columns in the present embodiment.

In the present embodiment, all the plurality of pixel electrodes 112 arranged within the display region 102a are arranged in a predetermined period, as described above. The pixel circuits 108 in 10 columns adjacent to the third scanning signal line driving circuit 120c among the plurality of pixel circuits 108 arranged within the display region 102a are spaced at a distance in the row direction. The distance is half of a distance among the pixel electrodes 112 in the row direction.

The sub-pixel electrodes 113 belonging to the pixels 106 in five columns overlapping the third scanning signal line driving circuit 120c are respectively connected to the sub-pixel circuits 109 belonging to the pixels 106 in five rows adjacent to the third scanning signal line driving circuit 120c.

From the above-described reason, the pixel electrodes 112 having a light reflection property and a layout of the pixel circuits 108 arranged in a layer located therebelow can be almost independently designed. That is, in one of the pixels 106, the pixel electrode 112 need not be arranged while overlapping the pixel circuit 108. Thus, the pixel electrodes 112 can be arranged while overlapping a region occupied by the third scanning signal line driving circuit 120c. Therefore, even if the third scanning signal line driving circuit 120c is arranged within the display region 102a, continuity of display is not inhibited due to the arrangement.

Furthermore, according to such an MIP driving method, respective gray levels are represented by the sub-pixel electrodes 113 using data held in a memory section. Therefore, a writing operation for writing a signal potential on which the gray level has been reflected for each pixel need not be performed in a frame period. Thus, the power consumption of the display device 200 is reduced.

Third Embodiment

A configuration of a display device 300 according to the present embodiment will be described with reference to the drawings. FIGS. 1, 2A, 2B, 3A, and 3B used in the description of the display device 100 according to the first embodiment are common in the display device 300 according to the present embodiment. Both the first embodiment and the second embodiment presuppose a liquid crystal display. However, the present invention is applied is also applicable to a self-luminous display device as another example not limited to a liquid crystal display. An example applied to an organic electroluminescence (EL) display device will be described in the present embodiment as an example of the self-luminous display device.

A circuit configuration of each of a plurality of pixel circuits 108 will be first described. A circuit configuration of the pixel circuit 108 described below is an example, and is not limited to this.

Figure 11:
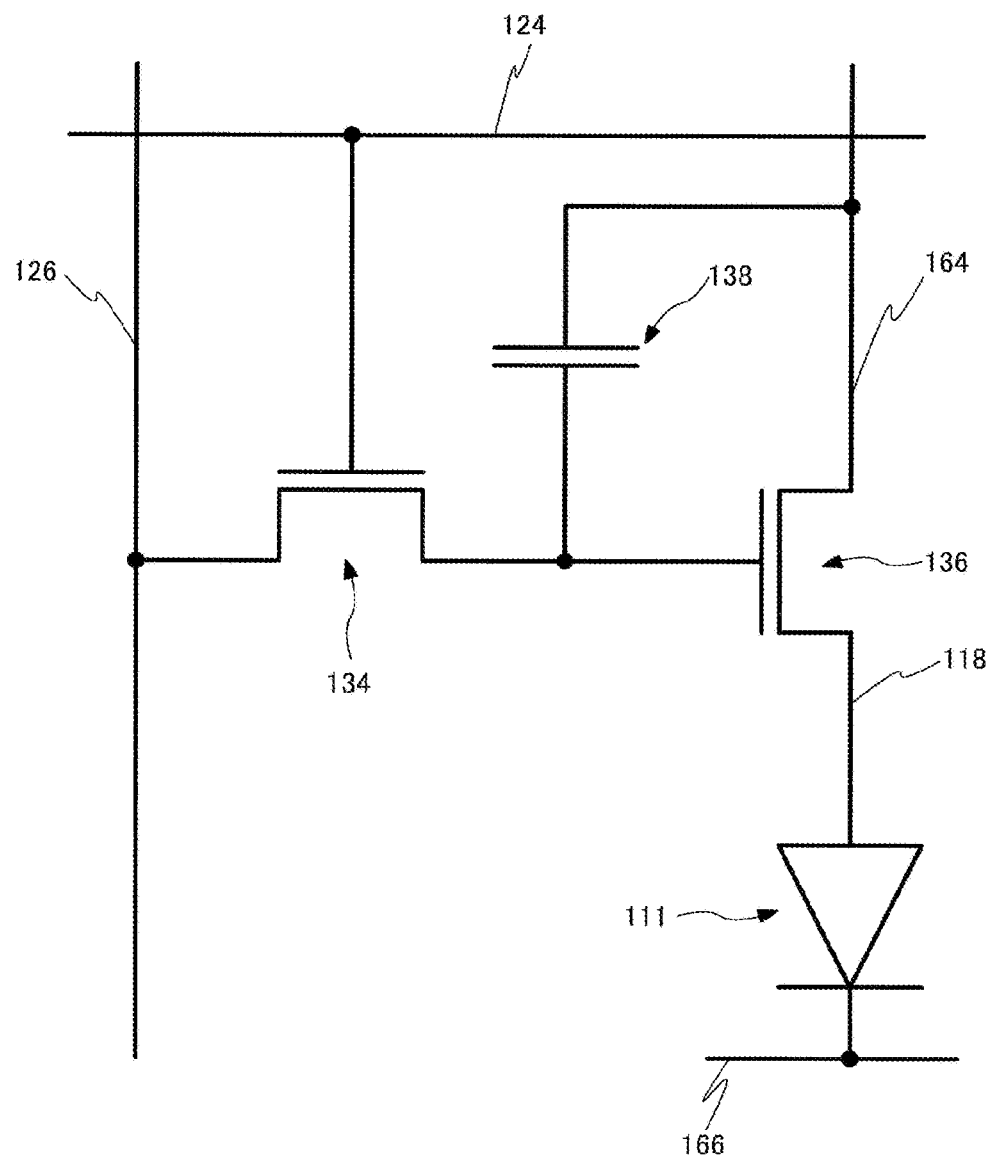
FIG. 11 is a circuit diagram illustrating a configuration of a pixel included in a display device according to a third embodiment of the present invention.

FIG. 11 is a circuit diagram illustrating a circuit configuration of each of the pixel circuits 108 included in the display device 300 according to the present embodiment. The pixel circuit 108 includes at least a driving transistor 136, a selection transistor 134, a light emitting element 111, and a capacitor 138.

The driving transistor 136 is a transistor connected to the light emitting element 111 and controlling luminescent luminance of the light emitting element 111. The driving transistor 136 has its gate connected to the selection transistor 134, its source connected to the driving power supply line 164, and its drain connected to the anode of the light emitting element 111. A drain current is controlled by a voltage between the gate and the source of the driving transistor 136.

The selection transistor 134 controls a conductive state between a video signal line 126 and the gate of the driving transistor 136 by an on/off operation. The selection transistor 134 has its gate connected to a scanning signal line 124, its source connected to the video signal line 126, and its drain connected to the gate of the driving transistor 136.

The anode and the cathode of the light emitting element 111 are respectively connected to the drain of the driving transistor 136 and a reference power supply line 166.

The capacitor 138 is connected between the gate and the source of the driving transistor 136 to hold the voltage between the gate and the source of the driving transistor 136.

Figure 12:
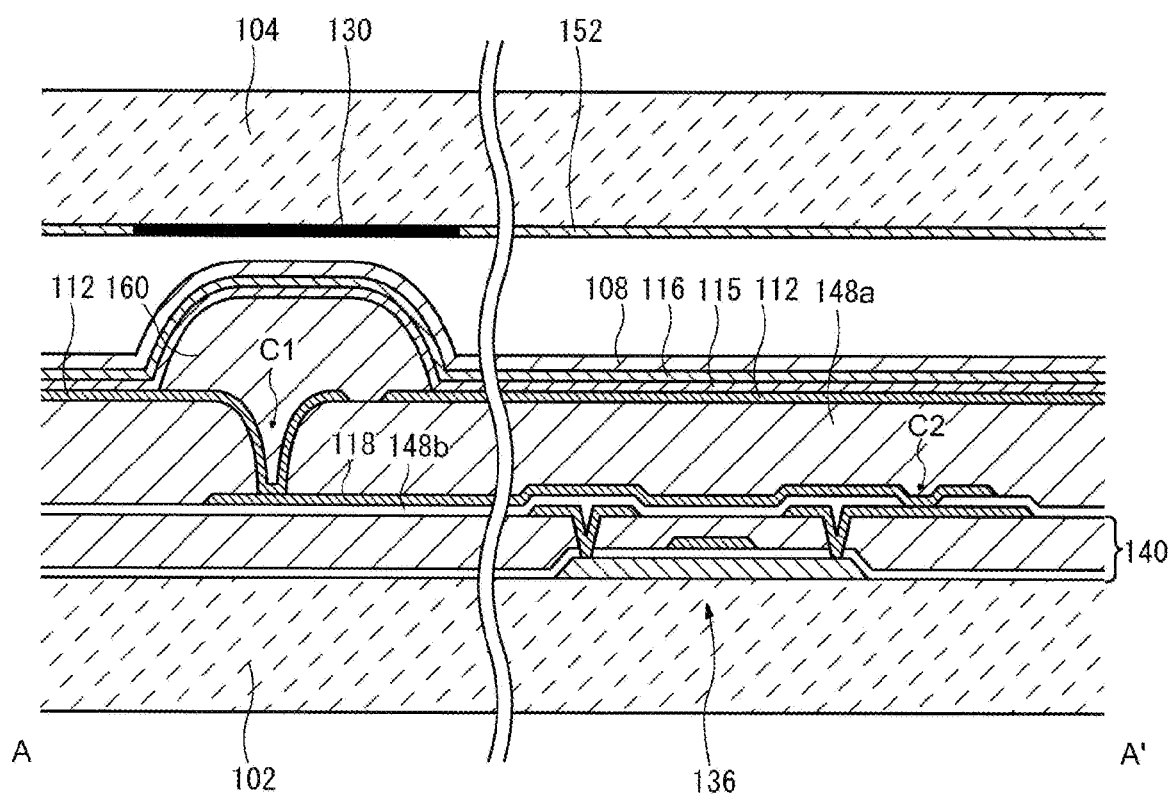
FIG. 12 is a cross-sectional view illustrating a configuration of the display device according to the third embodiment of the present invention.

FIG. 12 is a cross-sectional view along a relay wiring 118 of the display device 300 according to the present embodiment. The display device 300 according to the present embodiment includes the first substrate 102, a circuit layer 140, a pixel electrode layer 142, a relay wiring layer 144, a common electrode layer 146, a second substrate 104, and a light emitting layer 115.

The circuit layer 140 is arranged on one surface of the first substrate 102. The circuit layer 140 includes a plurality of pixel circuits 108, a plurality of scanning signal lines 124, a plurality of video signal lines 126, a first scanning signal line driving circuit 120a, a second scanning signal line driving circuit 120b, a third scanning signal line driving circuit 120c, a fourth scanning signal line driving circuit 120d, a video signal line driving circuit 122.

The plurality of pixel circuits 108 are respectively provided in the plurality of pixels 106. A detailed circuit configuration of the pixel circuit 108 has already been described. In FIG. 12, a driving transistor 136 within the pixel circuit 108 is illustrated.

The pixel electrode layer 142 is arranged in a layer above the circuit layer 140. The pixel electrode layer 142 includes a plurality of pixel electrodes 112. In the present embodiment, the plurality of pixel electrodes 112 are arranged in a matrix shape. Further, all the pixel electrodes 112 arranged in a row direction or a column direction are designed to be arranged in a predetermined period.

A material for the plurality of pixel electrodes 112 needs to include a metal having a light reflection property to reflect external light accepted in the light emitting element 111 toward the common electrode 116. As a metal having a light reflection property and having a high reflectivity, silver (Ag), for example, is preferably used.

A bank 160 is provided between the two adjacent pixel electrodes 112. The bank 160 is provided to cover a peripheral edge of the pixel electrode 112 and a first contact hole C1.

As a material for the bank 160, an insulating material is preferably used. As the insulating material, an inorganic insulating material or an organic insulating material can be used. When the bank 160 formed of an insulating material is arranged, the common electrode 116 and the pixel electrode 112 can be prevented from being shorted at an end of the pixel electrode 112. Further, the adjacent pixels 106 can be reliably insulated from each other.

The relay wiring layer 144 is arranged between the circuit layer 140 and the pixel electrode layer 142. The relay wiring layer 144 includes a relay wiring 118 for connecting the pixel circuit 108 provided in each of the plurality of pixels 106 and each of the plurality of pixel electrodes 112.

In the present embodiment, a first insulating layer 148a is arranged between the relay wiring layer 144 and the pixel electrode layer 142, and the relay wiring 118 and the pixel electrode 112 are connected to each other via the first contact hole C1 provided in a flattened insulating layer. A second insulating layer 148b is arranged between the relay wiring 118 and the circuit layer 140. The intermediate wiring layer 144 and the drain of the driving transistor 136 are connected to each other via a second contact hole C2 provided in the second insulating layer 148b.

The common electrode layer 146 is arranged in a layer above the pixel electrode layer 142. The common electrode layer 146 includes the common electrode 116 arranged over the plurality of pixels 106 arranged in a display region 102a.

As a material for the common electrode 116, a material having a translucent property and having a conductive property is preferably used to transmit light emitted by the light emitting layer 115. Examples of a material for the common electrode 116 preferably include ITO and IZO. Alternatively, as the common electrode 116, a metal layer having a thickness enough to transmit emitted light may be used.

The second substrate 104 is arranged to oppose the first substrate 102. The second substrate 104 is fixed to the first substrate 102 with a sealing material 128 surrounding the display region 102a.

A color filter 152 and a light shielding layer 130 may be provided on a surface, on the side opposing the first substrate 102, of the second substrate 104. The color filter 152 is arranged at a position opposing each of the plurality of pixel electrodes 112. The light shielding layer 130 is arranged at a position for zoning each of the plurality of pixel electrodes 112.

The light emitting layer 115 is sandwiched between the pixel electrode layer 142 and the common electrode layer 146. A material for the light emitting layer 115 is an organic EL material emitting light when supplied with a current. As an organic EL material, a low-molecular or high-molecular organic material can be used. If the low-molecular organic material is used, the light emitting layer 115 includes a luminescent organic material as well as a hole injection layer or an electron injection layer and further a hole transport layer or an electronic transport layer to sandwich the luminescent organic material therebetween.

A configuration of the display device 300 according to the present embodiment has been described above. The display device 300 according to the present embodiment presupposes a self-luminous display device using organic EL. Therefore, the pixel electrodes 112 having a light reflection property and a layout of the pixel circuits 108 arranged in a layer located therebelow can be independently designed within a range of a design rule. Thus, the pixel electrodes 112 can be arranged while overlapping at least a part of a region occupied by the scanning signal line driving circuit. Therefore, the frame of the display device 300 can be narrowed.

The embodiments of the present invention have been described above. However, the present invention is not limited to the above-described embodiments but can be subjected to various alterations without departing from the spirit of the present invention. It is needless to say that the alterations are included in the scope of the present invention.

What is claimed is:

1. A display device comprising:
   a first insulating layer including a first hole;
   a second insulating layer including a second hole;
   a plurality of pixel electrodes each including a metal having a light reflection property;
   a plurality of switching elements respectively provided for any one of the plurality of pixel electrodes;
   a light emitting element on the plurality of pixel electrodes;
   a bank between two adjacent pixel electrodes in the plurality of pixel electrodes; and
   a scanning signal line driving circuit inputting a driving signal to the plurality of switching elements,
   wherein the plurality of pixel electrodes includes a first pixel electrode connected to a first switching element of the plurality of switching elements via a relay wiring,
   the first pixel electrode does not overlap the first switching element,
   the first pixel electrode overlaps the scanning signal line driving circuit,
   the first insulating layer is over the second insulating layer,
   the second insulating layer covers a drain of the first switching element,
   the relay wiring is between the first insulating layer and the second insulating layer,
   the first pixel electrode is on the second insulating layer,
   the bank is formed to fill the first hole,
   the light emitting element covers the plurality of pixel electrodes and the bank,
   the relay wiring is connected to the first pixel electrode via the first hole and the drain of the first switching element via the second hole,
   the first hole does not overlap the second hole and the first switching element, and
   the bank covers a peripheral edge of the first pixel electrode and the first hole.

2. The display device according to claim 1, further comprising:
   a plurality of video signal lines arranged at intervals in a first direction; and
   a plurality of scanning signal lines arranged at intervals in a second direction,
   wherein in the first direction, at least three electrodes of the plurality of pixel electrodes overlap the scanning signal line driving circuit, and
   the first electrode is one of the three electrodes.

3. The display device according to claim 1, further comprising:
   a plurality of video signal lines arranged at intervals in a first direction; and
   a plurality of scanning signal lines arranged at intervals in a second direction,
   wherein in the first direction, the scanning signal line driving circuit includes a first scanning signal line driving circuit, a second scanning signal line driving circuit, and a third scanning line driving circuit.

4. The display device according to claim 1, wherein the bank overlaps an edge of the relay wiring.

5. The display device according to claim 1, further comprising a light emitting element on the first pixel electrode.

6. The display device according to claim 5, wherein the first insulating layer is thicker than the second insulating layer.

* * * * *